United States Patent
Iwai et al.

(10) Patent No.: US 9,799,868 B2
(45) Date of Patent: Oct. 24, 2017

(54) SEPARATOR FOR NON-AQUEOUS SECONDARY BATTERY AND NON-AQUEOUS SECONDARY BATTERY

(71) Applicant: TEIJIN LIMITED, Osaka-shi, Osaka (JP)

(72) Inventors: Ayumi Iwai, Iwakuni (JP); Takashi Yoshitomi, Iwakuni (JP); Satoshi Nishikawa, Iwakuni (JP)

(73) Assignee: TEIJIN LIMITED, Osaka (JP)

( * ) Notice: Subject to any disclaimer, the term of this patent is extended or adjusted under 35 U.S.C. 154(b) by 610 days.

(21) Appl. No.: 14/352,489

(22) PCT Filed: Oct. 19, 2012

(86) PCT No.: PCT/JP2012/077135
§ 371 (c)(1),
(2) Date: Apr. 17, 2014

(87) PCT Pub. No.: WO2013/058371
PCT Pub. Date: Apr. 25, 2013

(65) Prior Publication Data
US 2014/0248525 A1 Sep. 4, 2014

(30) Foreign Application Priority Data

Oct. 21, 2011 (JP) ................. 2011-231837

(51) Int. Cl.
H01M 2/16 (2006.01)
H01M 2/14 (2006.01)
H01M 10/052 (2010.01)

(52) U.S. Cl.
CPC ......... *H01M 2/1686* (2013.01); *H01M 2/168* (2013.01); *H01M 2/14* (2013.01); *H01M 2/145* (2013.01); *H01M 2/1653* (2013.01); *H01M 2/1673* (2013.01); *H01M 10/052* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 6,387,565 B1 * | 5/2002 | Aihara | H01M 2/1673 429/145 |
| 2010/0173187 A1 * | 7/2010 | Nishikawa | H01M 2/145 429/129 |
| 2011/0281150 A1 | 11/2011 | Yong et al. | |

FOREIGN PATENT DOCUMENTS

| | | |
|---|---|---|
| JP | 2004-146190 A | 5/2004 |
| JP | 2005-190736 A | 7/2005 |
| JP | 2007-273123 A | 10/2007 |
| JP | 2008-508391 A | 3/2008 |
| JP | 2008-524824 A | 7/2008 |
| JP | 2010-15917 A | 1/2010 |
| JP | 2010-160939 A | 7/2010 |
| JP | 2010-240936 A | 10/2010 |
| JP | 4988972 B1 | 8/2012 |
| JP | 4988973 B1 | 8/2012 |
| WO | 99/36981 A1 | 7/1999 |
| WO | 2008/156033 A1 | 12/2008 |

OTHER PUBLICATIONS

Japanese Office Action for JP 2013-510829 dated May 14, 2013.
International Search Report of PCT/JP2012/077135 dated Jan. 8, 2013.

* cited by examiner

*Primary Examiner* — Ula C Ruddock
*Assistant Examiner* — Matthew Van Oudenaren
(74) *Attorney, Agent, or Firm* — Sughrue Mion, PLLC

(57) ABSTRACT

A separator for a non-aqueous secondary battery includes a porous substrate and an adhesive porous layer provided on one or both sides of the porous substrate, the adhesive porous layer including a polyvinylidene-fluoride resin and a filler whose difference between a particle diameter at 90% cumulative volume and a particle diameter at 10% cumulative volume is 2 μm or less, and the adhesive porous layer satisfying Inequality (1): $0.5 \leq a/r \leq 3.0$, wherein, in Inequality (1), "a" represents an average thickness (μm) of the adhesive porous layer on one of the sides of the porous substrate; and "r" represents a volume average particle diameter (μm) of the filler contained in the adhesive porous layer.

7 Claims, No Drawings

SEPARATOR FOR NON-AQUEOUS SECONDARY BATTERY AND NON-AQUEOUS SECONDARY BATTERY

CROSS REFERENCE TO RELATED APPLICATIONS

This application is a National Stage of International Application No. PCT/JP2012/077135 filed Oct. 19, 2012 (claiming priority based on Japanese Patent Application No. 2011-231837 filed Oct. 21, 2011), the contents of which are incorporated herein by reference in their entirety.

TECHNICAL FIELD

This invention relates to a separator for a non-aqueous secondary battery and a non-aqueous secondary battery.

BACKGROUND ART

Non-aqueous secondary batteries, which are represented by lithium-ion secondary batteries, are widely used as main power sources of portable electronic devices such as a mobile phone and a notebook computer. Their application has been expanded to a main power source of an electric vehicle or a hybrid vehicle, a power storage system for night-time electric power, and the like. Along with the widespread use of non-aqueous secondary batteries, ensuring stable electrical characteristics and safety becomes an issue.

Separators have significant roles in ensuring the safety of non-aqueous secondary batteries. In particular, in terms of a shutdown function, a polyolefin microporous membrane which has a polyolefin as a main component is used in the present circumstances.

However, a separator composed of only a polyolefin microporous membrane has a possibility that the entire separator is melted (so-called melt-down) when the separator is exposed to temperatures exceeding a temperature at which the shutdown function is exhibited.

In addition, a polyolefin resin shows poor adhesiveness to other resins or other materials, and thus adhesiveness between a polyolefin microporous membrane and an electrode is insufficient, which may result in capacity loss or cycle characteristics deterioration.

A provision of a porous layer containing various resins and fillers on one or both sides of a polyolefin microporous membrane has been proposed in view of improving heat resistance of a separator or improving adhesiveness between an electrode and a separator (for example, see Patent Documents 1 to 7).

In particular, as a technique to improve adhesiveness between an electrode and a separator, a separator in which a porous layer which has a polyvinylidene-fluoride resin (hereinafter, referred to as "PVDF layer") as a main component is formed on a polyolefin microporous membrane is known (for example, see Patent Documents 1 to 3).

PRIOR ART DOCUMENTS

[Patent Document 1] Japanese Patent Application Laid-Open (JP-A) No. 2004-146190
[Patent Document 2] Japanese Patent Application Laid-Open (JP-A) No. 2007-273123
[Patent Document 3] International Publication No. WO 1999/036981
[Patent Document 4] Japanese Patent Application Laid-Open (JP-A) No. 2010-240936
[Patent Document 5] Japanese Patent Application Laid-Open (JP-A) No. 2010-015917
[Patent Document 6] Japanese National-Phase Publication (JP-A) No. 2008-508391
[Patent Document 7] Japanese National-Phase Publication (JP-A) No. 2008-524824

SUMMARY OF INVENTION

Technical Problem

However, a PVDF layer has a property of being electrically charged easily, and thus easily charged with static electricity during a battery production process (for example, a separator conveying process at which friction is generated between a metal roll and the PVDF layer). Therefore, a separator having a PVDF layer is charged with static electricity and hardly slides, resulting the deterioration of the handling property. As a result, meandering occurs or wrinkles are generated during conveying the separator in the battery production process, which may cause a product defect of a battery. Even if a static electricity removing process to remove static electricity from a separator is provided, it is difficult to remove static electricity over the whole battery production process.

The invention was made in view of the above circumstances.

In view of the above circumstances, a separator for a non-aqueous secondary battery having good adhesiveness to an electrode and a good handling property is required.

Further, in view of the above circumstances, a non-aqueous secondary battery having good cycle characteristics and a high production yield is required.

Solution to Problem

Specific means for solving the problem are as follows:
<1> A separator for a non-aqueous secondary battery, comprising:
  a porous substrate; and
  an adhesive porous layer provided on one or both sides of the porous substrate, the adhesive porous layer comprising:
    a polyvinylidene-fluoride resin; and
    a filler, a difference between a particle diameter at 90% cumulative volume of the filler and a particle diameter at 10% cumulative volume of the filler being 2 µm or less, and the adhesive porous layer satisfying the following Inequality (1):

$$0.5 \leq a/r \leq 3.0 \qquad \text{Inequality (1)}$$

wherein, in Inequality (1), "a" represents an average thickness (µm) of the adhesive porous layer on one of the sides of the porous substrate; and "r" represents a volume average particle diameter (µm) of the filler contained in the adhesive porous layer.
<2> The separator for a non-aqueous secondary battery according to <1>, wherein a proportion of the filler with respect to a total mass of the polyvinylidene-fluoride resin and the filler is from 1% by mass to 30% by mass.
<3> The separator for a non-aqueous secondary battery according to <1> or <2>, wherein an average thickness of the adhesive porous layer on one of the sides of the porous substrate is from 0.5 µm to 5 µm.

<4> The separator for a non-aqueous secondary battery according to any one of <1> to <3>, wherein a volume average particle diameter of the filler is from 0.01 μm to 10 μm.

<5> A non-aqueous secondary battery comprising:
a positive electrode;
a negative electrode; and
the separator for a non-aqueous secondary battery according to any one of <1> to <4> arranged between the positive electrode and the negative electrode,
wherein the non-aqueous secondary battery obtains electromotive force by lithium doping/dedoping.

Advantageous Effects of Invention

According to the invention, a separator for a non-aqueous secondary battery having good adhesiveness to an electrode and a good handling property is provided.

Further, according to the invention, a non-aqueous secondary battery having good cycle characteristics and a high production yield is provided.

DESCRIPTION OF EMBODIMENTS

In the following, the embodiments of the invention are explained. Here, the following explanation and examples merely illustrate the invention and are not intended to limit the scope of the invention.

In this specification, the notation "A to B" expressing numerical range represents a range including the numerical values A and B, as the minimum value and the maximum value, respectively.

As used herein, the term "process" indicates not only an independent process but also a process that is not clearly distinguished from other process as long as a desired effect of the process is obtained therefrom.

<Separator for Non-Aqueous Secondary Battery>

The separator for a non-aqueous secondary battery of the invention (hereinafter also referred to as "separator") includes a porous substrate and an adhesive porous layer provided on one or both sides of the porous substrate, in which the adhesive porous layer includes a polyvinylidene-fluoride resin and a filler, a difference between a particle diameter at 90% cumulative volume of the filler and a particle diameter at 10% cumulative volume of the filler being 2 μm or less.

In addition, the adhesive porous layer satisfies the following Inequality (1).

$$0.5 \leq a/r \leq 3.0. \quad \text{Inequality (1)}$$

In Inequality (1), "a" represents an average thickness (μm) of the adhesive porous layer on one of the sides of the porous substrate; and "r" represents a volume average particle diameter (μm) of the filler contained in the adhesive porous layer.

In the invention, the volume average particle diameter (μm) of the filler is a particle diameter at 50% cumulative volume calculated from a smaller side in a volume particle size distribution.

The particle diameter at 10% cumulative volume of the filler is a particle diameter at which a cumulative volume of particles reaches 10% from a smaller side in a volume particle size distribution (hereinafter also referred to as "D10").

The particle diameter at 90% cumulative volume of the filler is a particle diameter at which a cumulative volume of particles reaches 90% from a smaller side in a volume particle size distribution (hereinafter also referred to as "D90").

In terms of improving adhesiveness to the electrode and slidability of the separator surface, the separator according to the invention includes the adhesive porous layer containing a polyvinylidene-fluoride resin and a filler. Further, the difference between D90 and D10 of the filler contained in the adhesive porous layer is 2 μm or less, and the adhesive porous layer satisfies the above Inequality (1). As a result, both adhesiveness to the electrode and the handling property are improved.

In the invention, in terms of ensuring adhesiveness of the adhesive porous layer to the electrode, the difference between D90 and D10 of the filler contained in the adhesive porous layer is 2 μm or less. In a case in which the difference between D90 and D10 is greater than 2 μm, inclusion of the filler results in generation of irregular portions that are non-uniform in size on the surface of the adhesive porous layer. In this case, adhesiveness of the adhesive porous layer to the electrode is insufficient, which result in deterioration of cycle characteristics of a battery.

In the invention, the ratio a/r between an average thickness "a" (μm) of the adhesive porous layer on one of the sides of the porous substrate and a volume average particle diameter "r" (μm) of the filler in the adhesive porous layer is from 0.5 to 3.0. In a case in which the average thickness "a" and the volume average particle diameter "r" satisfy the above relation, a state in which the filler is projected at a proper height is formed on a surface of the adhesive porous layer can be achieved. Therefore, the separator exhibits favorable slidability and has a good handling property.

In a case in which the ratio a/r is less than 0.5, the filler is projected at an excess height from the surface of the adhesive porous layer. In this case, adhesiveness between the electrode and the separator is insufficient, which results in deterioration of cycle characteristics of a battery. In addition, in a case in which the ratio a/r is less than 0.5, the filler projected from the surface of the adhesive porous layer is easily removed at the separator conveying process. From these viewpoints, the ratio a/r is preferably from 0.6 or more, and more preferably 0.7 or more.

On the other hand, in a case in which the ratio a/r exceeds 3.0, the filler is hardly projected from the surface of the adhesive porous layer, and slidability is hardly provided to the separator. As a result, a wrinkle is generated when conveying the separator, or a gauge band develops when winding the separator. Therefore, the handling property of the separator is insufficient. From these viewpoints, the ratio a/r is preferably from 2.5 or less, and more preferably 2.0 or less.

[Porous Substrate]

In the invention, the porous substrate refers to a substrate having pores or voids inside thereof. Examples of the substrate include: a microporous membrane; a porous sheet made of a fibrous material, such as a nonwoven fabric or a paper-like sheet; and a composite porous sheet made of such a microporous membrane or porous sheet and one or more other porous layers formed thereon. Here, the microporous membrane refers to a membrane having a structure in which a large number of micropores are present and the micropores are connected to one another, which allows gas or liquid to pass therethrough from one side to the other side.

The material forming the porous substrate may be an organic material or an inorganic material as long as the material has an electrical insulation property.

In terms of imparting a shutdown function to the porous substrate, the material forming the porous substrate is preferably a thermoplastic resin. Here, the shutdown function refers to the following function: in a case in which the battery temperature increases, the material forming the porous substrate melts and blocks the pores of the porous substrate, thereby blocking the movement of ions to prevent the thermal runaway of the battery. As the thermoplastic resin, a thermoplastic resin having a melting point of less than 200° C. is suitable, and a polyolefin is particularly preferable.

As a porous substrate using a polyolefin, a polyolefin microporous membrane is preferable.

Polyolefin microporous membranes having sufficient mechanical properties and ion permeability may be selected as the polyolefin microporous membrane from those have been applied to conventional non-aqueous secondary battery separators.

In terms of exerting the shutdown function, the polyolefin microporous membrane preferably contains polyethylene, and a content of the polyethylene is preferably 95% by mass or more.

In addition, in terms of imparting heat resistance to such a degree that the membrane does not easily break when exposed to high temperatures, a polyolefin microporous membrane containing polyethylene and polypropylene is preferable. Examples of the polyolefin microporous membrane include a microporous membrane in which both polyethylene and polypropylene are present in one layer. In terms of achieving both the shutdown function and heat resistance, it is preferable that the microporous membrane contains polyethylene in an amount of 95% by mass or more and polypropylene in an amount of 5% by mass or less. In terms of achieving both the shutdown function and heat resistance, it is also preferable that the polyolefin microporous membrane has a laminate structure including at least two layers, in which at least one layer contains polyethylene and at least one layer contains polypropylene.

The weight average molecular weight of the polyolefin contained in the polyolefin microporous membrane is preferably from 100,000 to 5,000,000. In a case in which the weight average molecular weight is 100,000 or more, sufficient mechanical properties are ensured. Meanwhile, in a case in which the weight average molecular weight is 5,000,000 or less, good shutdown characteristics can be obtained, and the membrane can be easily formed.

The polyolefin microporous membrane can be produced by the following method, for example. That is, it is possible to employ a method in which a microporous membrane is formed by: extruding a molten polyolefin resin from a T-die to form a sheet; subjecting the sheet to a crystallization treatment; stretching the sheet; and heat-treating the sheet. In addition, it is also possible to employ a method in which a microporous membrane is formed by melting a polyolefin resin together with a plasticizer such as liquid paraffin and extruding the melt from a T-die, followed by cooling to form a sheet; stretching the sheet; extracting the plasticizer from the sheet; and heat-treating the sheet.

Examples of the porous sheet made of a fibrous material include a porous sheet made of a fibrous material containing a polyester such as polyethylene terephthalate, a polyolefin such as polyethylene or polypropylene, or a heat-resistant polymer such aromatic polyamide, polyimide, polyethersulfone, polysulfone, polyether ketone, or polyetherimide; or a mixture of such fibrous materials.

The composite porous sheet may be configured to include a microporous membrane or a porous sheet made of a fibrous material and a functional layer formed thereon. Such a composite porous sheet is preferable because a further function can be imparted by the functional layer. As the functional layer, for example, in terms of imparting heat resistance, a porous layer formed of a heat-resistant resin or a porous layer formed of a heat-resistant resin and a filler may be used. The heat-resistant resin may be one or more kinds of heat-resistant polymers selected from the group consisting of an aromatic polyamide, polyimide, polyethersulfone, polysulfone, polyether ketone, and polyetherimide. Examples of suitable fillers include heat-resistant polymer particles such as cross-linked polyacrylic acid, cross-linked polyacrylate, cross-linked polymethacrylic acid, cross-linked polymethacrylate, cross-linked polymethylmethacrylate, and cross-linked polysilicone; metal oxides such as alumina; and metal hydroxides such as magnesium hydroxide. Here, examples of methods of forming the composite sheet include a method in which a microporous membrane or a porous sheet is coated with a functional layer; a method in which a microporous membrane or a porous sheet and a functional layer are joined together using an adhesive; and a method in which a microporous membrane or a porous sheet and a functional layer are bonded together by thermocompression.

In the invention, in terms of obtaining good mechanical properties and internal resistance, a film thickness of the porous substrate is preferably from 5 μm to 25 μm.

In terms of preventing a short circuit in the battery and obtaining sufficient ion permeability, the Gurley value (JIS P8117) of the porous substrate is preferably from 50 sec/100 cc to 800 sec/100 cc.

In terms of improving the production yield, the puncture resistance of the porous substrate is preferably 300 g or more.

[Adhesive Porous Layer]

In the invention, the adhesive porous layer is a layer having a structure in which a large number of micropores are present inside thereof and the micropores connect to one another, which allows gas or liquid to pass therethrough from one side to the other side.

In the invention, the adhesive porous layer is also a layer that is provided on one or both sides of the porous substrate as an outermost layer of the separator, and can adhere to the electrode.

In terms of achieving good cycle characteristics of the battery, it is preferable that the adhesive porous layer is provided on both sides of the porous substrate rather than on one side. In a case in which the adhesive porous layer is provided on both sides of the porous substrate, both sides of the separator can be firmly bonded to both electrodes via the adhesive porous layer.

In the invention, in terms of ensuring adhesiveness to electrodes and high energy density, an average thickness of the adhesive porous layer on one side of the porous substrate is preferably from 0.5 μm to 5 μm, and more preferably from 1 μm to 5 μm.

In the invention, in terms of ion permeability, it is preferable that the adhesive porous layer has a structure having sufficient porosity. In particular, it is preferable that the adhesive porous layer has a porosity of from 30% to 60%. In a case in which the porosity is 60% or less, a mechanical property of the adhesive porous layer which is enough to withstand a pressing process for adhering it to the electrode can be ensured. In addition, in a case in which the porosity is 60% or less, the surface open-pore density is not too high and sufficient adhesion strength can be ensured. On the other hand, in a case in which the porosity is 30% or more, good ion permeability can be obtained.

In the invention, an average pore diameter of the adhesive porous layer is preferably from 20 nm to 100 nm. In a case in which the average pore diameter is 100 nm or less, non-uniformity of the pores at the surface of the adhesive porous layer is suppressed and the adhesion points are uniformly scattered, as a result of which sufficient adhesiveness to the electrode can be achieved. In addition, in a case in which the average pore diameter is 100 nm or less, the movement of ions tends to be uniform, whereby cycle characteristics and load characteristics can be improved. On the other hand, in a case in which the average pore diameter is 20 nm or more, the blockage of the pores can be suppressed even when the polyvinylidene-fluoride resin included in the adhesive porous layer swells during impregnation with an electrolyte, whereby impairing of ion permeability can be suppressed.

In the invention, a surface roughness of the adhesive porous layer is preferably from 0.8 μm to 8.0 μm, more preferably from 0.9 μm to 6.0 μm, and still more preferably from 1.0 μm to 3.0 μm, in terms of the ten-point mean roughness (Rz). The ten-point mean roughness (Rz) is a value measured by a method according to JIS B 0601-1994 (or Rzjis according to JIS B 0601-2001). More specifically, Rz in the invention is a value measured using an ET4000 (manufactured by Kosaka Laboratory Ltd.) under conditions of: a measurement length of 1.25 mm; a measurement speed of 0.1 mm/sec; and a temperature and humidity of 25° C./50% RH.

In the invention, a dynamic friction coefficient of the adhesive porous layer is preferably from 0.1 to 0.6, more preferably from 0.1 to 0.4, and still more preferably from 0.1 to 0.3. The dynamic friction coefficient is a value measured by a method according to JIS K 7125. More specifically, the dynamic friction coefficient in the invention is a value measured using a HEIDON surface property tester.

In the invention, in terms of adhesiveness to the electrode and ion permeability, a coating amount of the adhesive porous layer is preferably from 1.0 g/m$^2$ to 3.0 g/m$^2$ in terms of the total amount on both sides of the porous substrate. Further, a coating amount of the adhesive porous layer is preferably from 0.5 g/m$^2$ to 1.5 g/m$^2$ in terms of the amount on one side of the porous substrate.

In the invention, in a case in which the adhesive porous layer is provided on both sides of the porous substrate, a difference between the coating amount on one side and the coating amount of the other side is preferably 20% or less with respect to the total amount of the coating amounts on both sides. In a case in which the difference is 20% or less, curling of the separator hardly occurs, as a result of which a good handling property can be obtained and a problem of deterioration in cycle characteristics can hardly occur.

[Polyvinylidene-Fluoride Resin]

In the invention, the adhesive porous layer includes a polyvinylidene-fluoride resin.

Examples of the polyvinylidene-fluoride resin include a homopolymer of vinylidene fluoride (i.e., polyvinylidene fluoride); a copolymer of vinylidene fluoride and another co-polymerizable monomer (i.e., polyvinylidene-fluoride copolymer); and a mixture thereof.

Examples of the monomer co-polymerizable with vinylidene fluoride include hexafluoropropylene, tetrafluoroethylene, trifluoroethylene, trichloroethylene, and vinyl fluoride; and one or more kinds of these monomers may be used.

The polyvinylidene-fluoride resin may be synthesized by an emulsion polymerization method or a suspension polymerization method.

The polyvinylidene-fluoride resin preferably contains vinylidene fluoride in an amount of 95% by mole or more (more preferably in an amount of 98% by mole or more) as a structural unit. In a case in which vinylidene fluoride is contained in an amount of 95% by mole or more, the mechanical property and heat resistance enough to withstand an application of pressure and heat during battery production can be easily ensured.

In the invention, an embodiment in which the adhesive porous layer includes two kinds of polyvinylidene-fluoride resins (the following first resin and second resin) containing hexafluoropropylene in different amounts is also preferable.

First resin: a vinylidene fluoride/hexafluoropropylene copolymer containing hexafluoropropylene in an amount exceeding 0% by mole and 1.5% by mole or less; or a homopolymer of vinylidene fluoride (i.e., the content of hexafluoropropylene is 0% by mole).

Second resin: a vinylidene fluoride/hexafluoropropylene copolymer containing hexafluoropropylene in an amount exceeding 1.5% by mole.

In the adhesive porous layer that includes the two kinds of resins, adhesiveness between the adhesive porous layer and the electrode is improved compared to an adhesive porous layer that does not include either one of these two resins.

In the adhesive porous layer that includes the two kinds of resins, adhesiveness between the adhesive porous layer and the porous substrate is improved and a force required for separating these layers from each other is increased compared to an adhesive porous layer that does not include either one of these two resins.

A mixing ratio of the first resin and the second resin (mass ratio, the first resin:the second resin) is preferably from 15:85 to 85:15.

A weight average molecular weight of the polyvinylidene-fluoride resin is preferably from 300,000 to 3,000,000. In a case in which the weight average molecular weight is 300,000 or more, mechanical properties of the adhesive porous layer enough to withstand a treatment of attaching it to the electrode are ensured, whereby sufficient adhesiveness can be achieved. On the other hand, in a case in which the weight average molecular weight is 3,000,000 or less, a viscosity of a coating liquid used for forming a layer by coating does not become too high, whereby good formability can be achieved. The weight average molecular weight is more preferably within a range of 300,000 to 2,000,000, and still more preferably within a range of 500,000 to 1,500,000.

In terms of cycle characteristics, a fibril diameter of the polyvinylidene-fluoride resin is preferably from 10 nm to 1,000 nm.

In the invention, the adhesive porous layer may include an additional resin other than the polyvinylidene-fluoride resin. Examples of the additional resin include styrene-butadiene copolymers; homopolymers and copolymers of vinyl nitrile such as acrylonitrile or methacrylonitrile; and polyethers such as poly(ethylene oxide) and poly(propylene oxide).

[Filler]

In the invention, the adhesive porous layer includes a filler formed from an inorganic material or an organic material. Inclusion of the filler may improve slidability and the heat resistance of the separator.

As the filler, any organic or inorganic filler that is stable in a non-aqueous electrolyte and electrochemically stable may be used. In terms of ensuring the safety of the battery, the filler is preferably a filler having a heat-resistance temperature of 150° C. or higher.

Examples of the organic filler include particles of a cross-linked polymer such as cross-linked polyacrylic acid, cross-linked polyacrylate, cross-linked polymethacrylic acid, cross-linked polymethacrylate, cross-linked polymethylmethacrylate, cross-linked polysilicone, cross-linked polystyrene, cross-linked polyvinylbenzene, a cross-linked product of a styrene-divinylbenzene copolymer, polyimide, a melamine resin, a phenolic resin, or a condensation product of a benzoguanamine-formaldehyde; and particles of a heat-resistant polymer such as polysulfone, polyacrylonitrile, polyaramid, polyacetal, or thermoplastic polyimide.

The resin (polymer) forming the organic filler may be a mixture product, a modified product, a derivative, a co-polymer (a random copolymer, an alternate copolymer, a clock copolymer, or a graft copolymer), or a cross-linked product of the molecular species exemplified above.

Examples of the inorganic filler include a metal hydroxides such as aluminum hydroxide, magnesium hydroxide, calcium hydroxide, chromium hydroxide, zirconium hydroxide, nickel hydroxide, or boron hydroxide; a metal oxide such as alumina or zirconia; a carbonate such as calcium carbonate or magnesium carbonate; a sulfate such as barium sulfate or calcium sulfate; and a clay mineral such as calcium silicate or talc. In terms of providing flame resistance and an effect of neutralization, a metal hydroxide is preferable.

These fillers may be used singly, or in combination of two or more kinds thereof.

In terms of ensuring good adhesiveness and slidability, and moldability of the separator, a volume average particle diameter of the filler is preferably from 0.01 µm to 10 µm. The lower limit of the volume average particle diameter is preferably 0.1 µm or more, and the upper limit thereof is preferably 5 µm or less.

The filler may have an arbitrary shape and may have either a spherical shape, an elliptical shape, a plate-like shape, a rod-like shape, or an amorphous shape. In terms of preventing a short circuit in the battery, the filler is preferably a plate-shaped particle or a non-aggregated primary particle.

Inclusion of the filler can improve slidability, since fine irregular portions are generated on the surface of the adhesive porous layer. In a case in which the filer is a plate-shaped particle or a non-aggregated primary particle, finer irregular portions are generated by the filler on the surface of the adhesive porous layer, whereby adhesiveness to the electrode can be improved.

In the adhesive porous layer, a proportion of the filler with respect to a total mass of the polyvinylidene-fluoride resin and the filler is preferably from 1% by mass to 30% by mass.

In a case in which the proportion of the filler is 1% by mass or more, the effect of generating irregular portions on the surface of the adhesive porous layer to improve slidability of the separator is easily exerted. From this viewpoint, the proportion of the filler is more preferably 3% by mass or more.

On the other hand, in a case in which the proportion of the filler is 30% by mass or less, the mechanical strength of the adhesive porous layer and the separator can be maintained, and cracking of the separator which may occur in, for example, manufacturing an electrode body by stacking and winding the electrode and the separator is suppressed. From this viewpoint, the proportion of the filler is more preferably 20% by mass or less, and still more preferably 10% by mass or less.

In the adhesive porous layer, in terms of suppressing occurrence of scuffing, folding, or slit chip contamination at a slit end surface when the separator is slit, the proportion of the filler with respect to the total mass of the polyvinylidene-fluoride resin and the filler is preferably from 1% by mass or more, and more preferably from 3% by mass or more.

An adhesive porous layer composed of only a resin is too soft and is difficult to cut off, and scuffing, folding, or slit chip contamination may occur at the slit end surface. However, in a case in which the adhesive porous layer includes the filler at a content ratio described above, the separator has an appropriate hardness and is easily slit, which results in suppression of scuffing, folding, or slit chip contamination at the slit end surface.

The suppression of scuffing, folding, or slit chip contamination at the slit end surface of the separator is preferable since adhesiveness to the electrode and the production yield can be improved.

[Property of Separator]

In terms of mechanical strength and energy density when assembled in a battery, a total film thickness of the separator according to the invention is preferably from 5 µm to 35 µm, and more preferably from 10 µm to 20 µm.

In terms of adhesiveness to an electrode, the handling property, mechanical strength, and ion permeability, a porosity of the separator according to the invention is preferably from 30% to 60%.

In terms of a good balance between mechanical strength and membrane resistance, the Gurley value (JIS P8117) of the separator according to the invention is preferably from 50 sec/100 cc or to 800 sec/100 cc.

In the separator according to the invention, in terms of ion permeability, the difference between the Gurley value of the porous substrate and that of the separator obtained by forming an adhesive porous layer on the porous substrate is preferably 300 sec/100 cc or less, more preferably 150 sec/100 cc or less, and still more preferably 100 sec/100 cc or less.

In terms of ion permeability, a tortuosity of the separator according to the invention is preferably from 1.5 to 2.5.

In terms load characteristics of the battery, a membrane resistance of the separator according to the invention is preferably from 1 ohm·cm² to 10 ohm·cm². Here, the membrane resistance means a resistance of the separator impregnated with an electrolyte and is measured by an AC method. Although the value naturally varies depending on the kind and the temperature of the electrolyte, the above value is a value measured at 20° C. using 1 M $LiBF_4$-propylene carbonate/ethylene carbonate (mass ratio: 1/1) as an electrolyte.

A heat shrinking ratio at 105° C. of the separator according to the invention is preferably 10% or less both in the machine direction and the transverse direction. In a case in which the heat shrinking ratio is within the above range, the dimension stability of the separator and shutdown characteristics can be balanced. The heat shrinking ratio is more preferably 5% or less.

[Method of Producing Separator for Non-Aqueous Secondary Battery]

The separator according to the invention can be produced, for example, by a method in which a solution containing a polyvinylidene-fluoride resin and a filler is applied onto a porous substrate to form a coating layer, and then the polyvinylidene-fluoride resin in the coating layer is solidified, thereby integrally forming an adhesive porous layer on the porous substrate.

The adhesive porous layer containing the polyvinylidene-fluoride resin and the filler can be formed, for example, by the following wet coating method.

First, a polyvinylidene-fluoride resin is dissolved in a solvent, and a filler is dispersed therein, thereby preparing a coating liquid. The coating liquid is applied onto a porous substrate, followed by immersion in an appropriate solidification liquid. As a result, the polyvinylidene-fluoride resin is solidified while inducing phase separation. Through this step, a layer of porous structure including the polyvinylidene-fluoride resin and the filler is formed on the porous substrate. Subsequently, the resultant is washed with water and dried, thereby removing the solidification liquid from the layer of porous structure.

The detail of the wet coating method which is preferable in the invention is as follows.

Preferable examples of a solvent that dissolves the polyvinylidene-fluoride resin for preparing the coating liquid (hereinafter also referred to as "good solvent") include polar amide solvents such as N-methyl-2-pyrrolidone (NMP), dimethylacetamide, dimethylformamide, and dimethylformamide.

In terms of forming a good porous structure, it is preferable that a phase-separation agent that induces phase separation is mixed with the good solvent. Examples of the phase-separation agent include water, methanol, ethanol, propyl alcohol, butyl alcohol, butanediol, ethylene glycol, propylene glycol, and tripropylene glycol. It is preferable that such a phase-separation agent is added within a range where viscosity suitable for coating can be ensured.

In terms of forming a good porous structure, the solvent is preferably a mixture solvent that contains the good solvent in an amount of 60% by mass or more and the phase-separation agent in an amount of from 5% by mass to 40% by mass.

In terms of forming a good porous structure, the coating liquid preferably contains the polyvinylidene-fluoride resin at a concentration of from 3% by mass to 10% by mass.

In terms of imparting slidability to the adhesive porous layer and forming a good porous structure, a proportion of the filler with respect to a total mass of the polyvinylidene-fluoride resin and the filler is preferably from 1% by mass to 30% by mass, and more preferably from 3% by mass to 28% by mass.

The solidification liquid generally includes water, and the good solvent and the phase-separation agent used for the preparation of the coating liquid. In terms of production, it is preferable that a mixing ratio of the good solvent to the phase-separation agent thereof is consistent with the mixing ratio of the mixture solvent used for dissolving the polyvinylidene-fluoride resin. In terms of forming a good porous structure and productivity, a concentration of water therein is preferably from 40% by mass to 90% by mass.

For the application of the coating liquid to the porous substrate, a conventional coating technique can be employed, such as Mayer bar, die coater, reverse roll coater, or gravure coater. In a case in which the adhesive porous layer is formed on both sides of the porous substrate, in terms of productivity, it is preferable that the coating liquid is applied to both sides of the porous substrate simultaneously.

Other than the wet coating method mentioned above, the adhesive porous layer can be produced by a dry coating method. Here, the dry coating method is a method in which the coating liquid containing a polyvinylidene-fluoride resin, a filler, and a solvent is applied onto a porous substrate and then the resultant coating layer is dried to remove the solvent by volatilization, thereby obtaining a porous layer. However, the dry coating method tends to produce a denser coating layer as compared with the wet coating method. Therefore, in order to obtain a good porous structure, the wet coating method is preferable.

The separator according to the invention can also be produced by a method in which an adhesive porous layer is produced as a separate sheet, and then the adhesive porous layer is stacked on a porous substrate and combined thereto by thermocompression bonding or using an adhesive. Examples of the method for producing the adhesive porous layer as a separate sheet include a method in which a coating liquid containing a polyvinylidene-fluoride resin and a filler is applied onto a release sheet, then an adhesive porous layer is formed by the wet coating method or dry coating method mentioned above, and the adhesive porous layer is separated from the release sheet.

[Non-Aqueous Secondary Battery]

The non-aqueous secondary battery according to the invention is a non-aqueous secondary battery that obtains electromotive force by lithium doping/dedoping, and includes a positive electrode, a negative electrode, and the above-described separator for a non-aqueous secondary battery of the invention. The secondary battery has a configuration in which a battery element is enclosed in an outer package material, in which the battery element has a structure including a positive electrode and a negative electrode which are disposed so as to face each other via a separator and being impregnated with an electrolyte.

The non-aqueous secondary battery according to the invention is suitable for use as a non-aqueous electrolyte secondary battery, particularly for use as a lithium-ion secondary battery.

Here, the term "doping" means occlusion, support, adsorption, or insertion, and refers to a phenomenon in which lithium ions are introduced into an active material of an electrode such as a positive electrode.

The non-aqueous secondary battery according to the invention including as a separator the above-described separator for a non-aqueous secondary battery of the invention has good adhesiveness, thereby exhibiting good cycle characteristics.

Further, the non-aqueous secondary battery according to the invention produced by using the above-described separator for a non-aqueous secondary battery of the invention has a high production yield, since the separator has a good handling property.

The positive electrode may have a configuration in which an active material layer containing a positive electrode active material and a binder resin is formed on a current collector. The active material layer may further include an electrically conductive additive.

Examples of the positive electrode active material include lithium-containing transition metal oxides, and specific examples thereof include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCO_{1/2}Ni_{1/2}O_2$, and $LiAl_{1/4}Ni_{3/4}O_2$.

Examples of the binder resin include polyvinylidene-fluoride resins.

Examples of the electrically conductive additive include carbon materials such as acetylene black, ketjen black, and graphite powder.

Examples of the current collector include an aluminum foil, a titanium foil, and a stainless foil, each having a thickness of from 5 μm to 20 μm.

In the non-aqueous secondary battery according to the invention, in a case in which the adhesive porous layer is arranged on the positive-electrode side of the separator, because of the excellent oxidation resistance of the polyvinylidene-fluoride resin, there is an advantage in that a positive electrode active material that can be operated at a high voltage of 4.2 V or more, such as $LiMn_{1/2}Ni_{1/2}O_2$ or $LiCo_{1/3}Mn_{1/3}Ni_{1/3}O_2$, can be easily applied.

The negative electrode may have a configuration in which an active material layer containing a negative electrode active material and a binder resin is formed on a current collector. The active material layer may further include an electrically conductive additive.

Examples of the negative electrode active material include materials capable of electrochemically occluding lithium, and specific examples thereof include: carbon materials; and alloys of lithium and silicon, tin, aluminum or the like.

Examples of the binder resin include polyvinylidene-fluoride resins and styrene-butadiene rubber. In the separator of the invention, a good adhesiveness to a negative electrode can be ensured even in a case in which styrene-butadiene rubber is used as the binder for the negative electrode.

Examples of the electrically conductive additive include carbon materials such as acetylene black, ketjen black, and graphite powder Examples of the current collector include a copper foil, a nickel foil, and a stainless foil, each having a thickness of from 5 μm to 20 μm.

Instead of the negative electrode mentioned above, a metal lithium foil may be used as a negative electrode.

The electrolyte is a solution in which a lithium salt is dissolved in a non-aqueous solvent.

Examples of the lithium salt include $LiPF_6$, $LiBF_4$, and $LiClO_4$

Examples of the non-aqueous solvent include: cyclic carbonates such as ethylene carbonate, propylene carbonate, fluoroethylene carbonate, and difluoroethylene carbonate; linear carbonates such as dimethyl carbonate, diethyl carbonate, ethyl methyl carbonate, and fluorine-substituted products thereof; and cyclic esters such as γ-butyrolactone and γ-valerolactone. These solvents may be used singly, or in combination.

The electrolyte is preferably a solution obtained by dissolving, in a solvent containing a cyclic carbonate and a linear carbonate in a mass ratio (cyclic carbonate/linear carbonate) of from 20/80 to 40/60, a lithium salt at a concentration of 0.5M to 1.5 M.

In some cases, a separator including a conventional adhesive porous layer cannot easily exert adhesiveness to an electrode depending on the kind of electrolyte used. On the other hand, the separator of the invention is advantageous in that it can exhibit good adhesiveness regardless of the kind of electrolyte.

Examples of the outer package material include a metallic canister and an aluminum-laminated film package. A shape of the battery may be a rectangular shape, a cylinder shape, or a coin shape, to all of which the separator of the invention may be applied.

Since the separator of the invention has good adhesiveness to an electrode, a space is hardly formed between the electrode and the separator even when an impact is applied from the outside or when an electrode is expanded and contracted in association with charging and discharging. Therefore, the separator of the invention is suitable for use in a battery having an aluminum-laminated film package as an outer package material.

The non-aqueous secondary battery according to the invention can be produced, for example, by a method including: impregnating, with an electrolyte, a stacked body in which the separator of the invention is disposed between a positive electrode and a negative electrode and enclosing the stacked body in an outer package material (e.g., aluminum-laminated film package); and pressing the outer package material from above the outer package material.

The above-described production method allows the electrode and the separator to be well attached together, making it possible to obtain a non-aqueous secondary battery having excellent cycle life. In addition, because of good adhesiveness between the electrode and the separator, the battery excellent in safety can be obtained.

The separator of the invention can be adhered to the electrode by stacking them together. Therefore, the above-described pressing process is not an essential process in the battery production. However, in order to enhance adhesiveness between the electrode and the separator, it is preferable to perform the pressing process. In order to further enhance adhesiveness between the electrode and the separator, the pressing is preferably performed while heating (heat pressing).

The method of disposing the separator between the positive electrode and negative electrode may be a method in which at least each one layer of the positive electrode layer, the separator layer, and the negative electrode layer are stacked in this order (so-called stacking method), or a method in which the positive electrode, the separator, and the negative separator are piled up in this order and wound together in the length direction.

EXAMPLES

Hereinafter, the invention is described more specifically with reference to examples. The material, usage amount, proportion, processing procedure, or the like shown in the following examples may be appropriately changed without departing from the spirit of the invention. Therefore, the scope of the invention should not be interpreted to be limited to the following specific examples.

<Measurement Method>

The measurement methods employed in Examples and Comparative Examples of the invention are as follows.

[Average Thickness of Adhesive Porous Layer]

In a case in which the adhesive porous layer is formed on one of the sides of the porous substrate, the average thickness (μm) of the adhesive porous layer was determined by subtracting the average thickness of the porous substrate from the average thickness of the separator. In a case in which the adhesive porous layer is formed on both sides of the porous substrate, the average thickness (μm) of the adhesive porous layer was determined by subtracting the average thickness of the porous substrate from the average thickness of the separator and dividing the subtracted value by 2.

The average thickness (μm) of each of the separator and the porous substrate was determined by measuring arbitrary 20 points within an area of 10 cm×10 cm with a contact type thickness meter (LITEMATIC, manufactured by Mitutoyo Corporation), and averaging the value obtained. The measuring probe used had a cylindrical shape with a diameter of 5 mm, and adjustment was performed such that a load of 7 g was applied during the measurement.

[Particle Size Distribution and Particle Diameter of Filler]

The filler was dispersed in water containing a nonionic surfactant (TRITON X-100), and particle size distribution of the filler was determined with a laser diffraction particle size distribution measuring apparatus (MASTERSIZER 2000, produced by Sysmex Corporation). The particle diameter at 50% cumulative volume calculated from a smaller particle side in a volume particle size distribution was defined as the median diameter (D50), which is designated as the average particle diameter (μm) of the filler.

The particle diameter at 10% cumulative volume and the particle diameter at 90% cumulative volume calculated from a smaller particle side in a volume particle size distribution curve was designated as the 10% cumulative volume diameter (D10) and the 90% cumulative volume diameter (D90) of the filler, respectively, and the difference of these particle diameters "D90-D10" (μm) was calculated.

[Peeling Force]

Tapes (SCOTCH (registered trade name) MENDING TAPE 810, manufactured by 3M Company) were adhered to both sides of the separator, and the resultant was cut out in a size of 10 mm×200 mm to prepare a test piece. At one longitudinal-direction end of the test piece, each one end of the tapes on both sides of the test piece was separated from the separator. Both separated ends were clamped using a tensile tester (TENSILON UNIVERSAL TESTING MACHINE RTC-1210A, manufactured by Orientec Co. Ltd.). The separating test was performed under a condition in which a pulling direction was set to the orthogonal direction to the test piece plane and a tensile rate was set to 20 mm/min. An average of stress values of from 30 mm to 100 mm (the values obtained by continuous measurement of stress values during separating 30 mm to 100 mm of the tapes from the start of pulling) was designated as a peeling force (N/cm).

[Curving]

With respect to a separator of a certain length held planarly, in a case in which one end in the machine direction and the other end are different in length, these ends form curves substantially parallel to each other (the longer end forms an outer peripheral curve, and the shorter end forms an inner peripheral curve). The degree of curving was determined by the following method.

A separator formed into a long shape and having a width of 40 cm was vertically cut in the machine direction such that the machine-direction length at the central part in the width direction is 100 cm, thereby preparing a measurement sample.

The obtained measurement sample was held planarly on a flat surface. Both ends of the sample were visually inspected with respect to the degree of carving in the machine direction, and the end forming the inner peripheral (inner peripheral end) was selected. A straight line which connects both tips of the inner peripheral end was drawn, and the minimum distance (mm) between the straight line and the inner peripheral curve was measured at the center point of the straight line. The obtained value was used as an index of the curving.

[Charge Voltage]

A separator released from a roll was contacted with a plurality of metal rolls and resin rolls and was wound by a winding machine. The voltage (kV) in the vicinity of a winding roll during performing the winding was measured using an FMX-003 electrometer manufactured by Simco. The measurement was performed at an environmental temperature of 25° C. and a relative humidity of 40%.

[Surface Roughness]

The ten-point mean roughness (Rz) (μm) was measured using an ET4000 (manufactured by Kosaka Laboratory Ltd.) under conditions of: a measurement length of 1.25 mm; a measurement speed of 0.1 mm/sec; and a temperature and humidity of 25° C./50% RH.

[Static Friction Coefficient]

The static friction coefficient of the separator was measured by the following method using a card friction tester, produced by Toyo Seiki Seisaku-sho, Ltd.

A separator (7 cm×7 cm square) was adhered to a bottom (7 cm×7 cm square plane) of a weight of 1 kg. The bottom of the weight to which the separator was adhered was contacted with a SUS stage of the tester. Subsequently, the weight was pushed, and the force required for moving the separator with the weight placed thereon was measured. The static friction coefficient was determined based on this force and the vertical drag.

[Dynamic Friction Coefficient]

The dynamic friction coefficient of the separator was measured by a method according to JIS K7125 using a HEIDON surface property tester.

[Appearance of Roll]

A separator having a width of 400 mm was conveyed with a conveying tension of 1.5 N/cm and slit into 65 mm width. The slit separator was wound by 500 m on a resin tube which is made of ABS resin and has an outer diameter of 8 inches at a speed of 20 m/min. The presence or absence of a wrinkle and a gauge band on the roll surface and the condition of the slit end surface were evaluated by a visual inspection. Regarding the condition of the slit end surface, the condition in which none of scuffing, folding, and slit chip contamination had been detected was judged as "good", while the condition in which scuffing, folding, or slit chip contamination had been detected was judged as "defective".

[Adhesiveness to Electrodes]

Ten batteries for testing were each disassembled, and the force required for removing the negative or positive electrode from the separator was measured using a tensile tester. An average of the forces against the positive electrode and an average of the forces against the negative electrode were calculated, respectively. Further, the force against the positive electrode and the force against the negative electrode were averaged. A degree of the force in Example 1 was indexed as 100, and the indexes of respective Examples and Comparative Examples were calculated and evaluated based on the following criteria. Here, A and B are applicable for practical use.

A: 70 or more

B: 60 or more and less than 70

C: 50 or more and less than 60

D: less than 50

[Cycle Characteristics (Capacity Retention Ratio)]

With respect to ten batteries for testing, charging and discharging were repeated at 30° C. under the charge condition of constant-current constant-voltage charge at 1 C and 4.2 V, and the discharge condition of constant-current discharge at 1 C and 2.75 V cut-off. A value obtained by dividing the discharge capacity at 300 cycles of the charging and discharging by the initial capacity was designated as a capacity retention ratio (%), and an average of the values of the ten batteries were calculated. Here, the capacity retention ratio of 80% or more is applicable for practical use.

Example 1

[Production of Separator]

A vinylidene fluoride/hexafluoropropylene copolymer (mole ratio: 98.9/1.1; weight average molecular weight: 1,950,000) (hereinafter, referred to as "resin A") was used as a polyvinylidene-fluoride resin.

The resin A was dissolved in a mixture solvent containing dimethylacetamide and tripropylene glycol (dimethylacetamide/tripropylene glycol=7/3 by mass ratio) at a concentration of 5% by mass, and a cross-linked acrylic acid-resin filler (volume average particle diameter: 1.8 μm; D90-D10: 1.3 μm) (hereinafter, referred to as "organic filler A") was dispersed therein, thereby preparing a coating liquid. A content of the filler in the coating liquid was set to 5% by mass with respect to a total mass of the polyvinylidene-fluoride resin and the filler.

Equal amounts of the coating liquid were applied respectively to both sides of a polyethylene microporous membrane (membrane thickness: 9 μm; Gurley value: 160 sec/100 cc; porosity: 43%), followed by immersion in a solidification liquid (water/dimethylacetamide/tripropylene glycol=57/30/13 by mass ratio) having a temperature of 40° C. to solidify the copolymer.

The resultant was then washed with water and dried to give a separator having an adhesive porous layer containing the polyvinylidene-fluoride resin and the cross-linked acrylic acid-resin filler on both sides of the polyethylene microporous membrane.

[Production of Test Battery]

[Production of Negative Electrode]

300 g of artificial graphite as a negative electrode active material, 7.5 g of a water-soluble dispersion containing a modification product of a styrene-butadiene copolymer in an amount of 40% by mass as a binder, 3 g of carboxymethylcellulose as a thickener, and an appropriate amount of water were stirred in a double-arm mixer, thereby preparing a slurry for a negative electrode. The slurry for a negative electrode was applied to a copper foil having a thickness of 10 μm as a negative electrode current collector, and the resulting coating was dried and pressed, thereby preparing a negative electrode having a negative electrode active material layer.

[Production of Positive Electrode]

89.5 g of a powder of lithium cobalt oxide as a positive electrode active material, 4.5 g of acetylene black as an electrically conductive additive, and 6 g of polyvinylidene fluoride as a binder were dissolved in N-methyl-2-pyrrolidon such that a concentration of the polyvinylidene fluoride became 6% by mass, and the resulting solution was stirred in a double-arm mixer to prepare a slurry for a positive electrode. The slurry for a positive electrode was applied to an aluminum foil having a thickness of 20 μm as a positive electrode current collector, and the resulting coating was dried and pressed, thereby preparing a positive electrode having a positive electrode active material layer.

[Production of Buttery]

Lead tabs were weld to the positive and negative electrodes, and the positive electrode, the separator, and the negative electrode were stacked in this order to prepare a stacked body. The stacked body was impregnated with an electrolyte and enclosed in an aluminum-laminated film package. Here, 1 M LiPF$_6$-ethylene carbonate/ethyl methyl carbonate (mass ratio: 3/7) was used as the electrolyte.

The package was temporarily sealed by evacuating inside the package using a vacuum sealer. Subsequently, the package containing the stacked body was heat-pressed, thereby adhering the electrodes and the separator and sealing the package. The heat-pressing conditions were such that a load was 20 kg per cm$^2$ of electrode, the temperature was 90° C., and the press time was 2 minutes.

The physical property values and evaluation results from the separator and the test battery of Example 1 are shown in Table 2.

Examples 2 to 5

Separators of Examples 2 to 5 were obtained in the same manner as in Example 1, except that the average thickness a of the adhesive porous layer and the content of the filler therein were changed as shown in Table 1.

Test batteries of Examples 2 to 5 were obtained in the same manner as in Example 1.

The physical property values and evaluation results from the separators and the test batteries of Examples 2 to 5 are shown in Table 2.

Example 6

A separator of Example 6 was obtained in the same manner as in Example 1, except that a cross-linked acrylic acid-resin filler having a volume average particle diameter of 3.0 μm and D90-D10 of 2.0 μm (hereinafter, referred to as "organic filler B") was used instead of the organic filler A and that the average thickness a of the adhesive porous layer and the content of the filler therein were changed as shown in Table 1.

A test battery of Example 6 was obtained in the same manner as in Example 1.

The physical property values and evaluation results from the separator and the test battery of Example 6 are shown in Table 2.

Example 7

A separator of Example 7 was obtained in the same manner as in Example 1, except that an inorganic filler (volume average particle diameter: 1.2 μm; D90-D10: 1.6 μm) obtained by mixing a magnesium hydroxide filler having a volume average particle diameter of 1.6 μm (hereinafter, referred to as "inorganic filler C") and a magnesium hydroxide filler having a volume average particle diameter of 0.8 μm (hereinafter, referred to as "inorganic filler D") in a mass ratio of 1:1 was used instead of the organic filler A and that the average thickness a of the adhesive porous layer and the content of the filler therein were changed as shown in Table 1.

A test battery of Example 7 was obtained in the same manner as in Example 1.

The physical property values and evaluation results from the separator and the test battery of Example 7 are shown in Table 2.

Example 8

A separator of Example 8 was obtained in the same manner as in Example 1, except that a resin obtained by mixing the resin A and a vinylidene fluoride/hexafluoropropylene copolymer (mole ratio: 95.2/4.8; weight average molecular weight: 500,000) (hereinafter, referred to as "resin B") in a mass ratio of 60:40 was used instead of the resin A and that the average thickness a of the adhesive porous layer and the content of the filler therein were changed as shown in Table 1.

A test battery of Example 8 was obtained in the same manner as in Example 1.

The physical property values and evaluation results from the separator and the test battery of Example 8 are shown in Table 2.

Comparative Example 1

A separator of Comparative Example 1 was obtained in the same manner as in Example 1, except that the organic filler A was not used and that the average thickness a of the adhesive porous layer was changed as shown in Table 1.

A test battery of Comparative Example 1 was obtained in the same manner as in Example 1.

The physical property values and evaluation results from the separator and the test battery of Comparative Example 1 are shown in Table 2.

Comparative Example 2

A separator of Comparative Example 2 was obtained in the same manner as in Example 1, except that the inorganic filler D was used instead of the organic filler A and that the average thickness a of the adhesive porous layer and the content of the filler therein were changed as shown in Table 1.

A test battery of Comparative Example 2 was obtained in the same manner as in Example 1.

The physical property values and evaluation results from the separator and the test battery of Comparative Example 2 are shown in Table 2.

Comparative Example 3

A separator of Comparative Example 3 was obtained in the same manner as in Example 1, except that the average thickness a of the adhesive porous layer and the content of the filler therein were changed as shown in Table 1.

A test battery of Comparative Example 3 was obtained in the same manner as in Example 1.

The physical property values and evaluation results from the separator and the test battery of Comparative Example 3 are shown in Table 2.

Comparative Example 4

A separator of Comparative Example 4 was obtained in the same manner as in Example 1, except that a cross-linked acrylic acid-resin filler having a volume average particle diameter of 5.0 μm and D90-D10 of 3.6 μm (hereinafter, referred to as "organic filler E") was used instead of the organic filler A and that the average thickness a of the adhesive porous layer and the content of the filler therein were changed as shown in Table 1.

A test battery of Comparative Example 4 was obtained in the same manner as in Example 1.

The physical property values and evaluation results from the separator and the test battery of Comparative Example 4 are shown in Table 2.

Comparative Example 5

A separator of Comparative Example 5 was obtained in the same manner as in Example 1, except that the average thickness a of the adhesive porous layer was changed as shown in Table 1.

A test battery of Comparative Example 5 was obtained in the same manner as in Example 1.

The physical property values and evaluation results from the separator and the test battery of Comparative Example 5 are shown in Table 2.

Comparative Example 6

A separator of Comparative Example 6 was obtained in the same manner as in Example 1, except that the organic filler E was used instead of the organic filler A and that the average thickness a of the adhesive porous layer was changed as shown in Table 1.

A test battery of Comparative Example 6 was obtained in the same manner as in Example 1.

The physical property values and evaluation results from the separator and the test battery of Comparative Example 6 are shown in Table 2.

Comparative Example 7

A separator of Comparative Example 7 was obtained in the same manner as in Example 1, except that a cross-linked acrylic acid-resin filler having a volume average particle diameter of 4.0 μm and D90-D10 of 2.5 μm (hereinafter, referred to as "organic filler F") was used instead of the organic filler A and that the average thickness a of the adhesive porous layer and the content of the filler therein were changed as shown in Table 1.

A test battery of Comparative Example 7 was obtained in the same manner as in Example 1.

The physical property values and evaluation results from the separator and the test battery of Comparative Example 7 are shown in Table 2.

With regard to the separators of Examples 1 to 8, moisture was vaporized at 120° C. using a moisture vaporizing device (VA-100, manufactured by Mitsubishi Analytech Co., Ltd.) and then a water content was measured using a Karl-Fischer moisture meter (CA-100, manufactured by Mitsubishi Chemical Co., Ltd.). As a result, the water content of each of the separators of Examples 1 to 8 was 1,000 ppm or less.

TABLE 1

|  | Average thickness a (μm) of adhesive porous layer | Resin type | Filler Type | Volume average particle diameter r (μm) | D90 − D10 (μm) | Content (% by mass) | a/r |
|---|---|---|---|---|---|---|---|
| Example 1 | 2.1 | Resin A | Organic filler A | 1.8 | 1.3 | 5 | 1.2 |
| Example 2 | 1.1 | Resin A | Organic filler A | 1.8 | 1.3 | 20 | 0.6 |
| Example 3 | 1.5 | Resin A | Organic filler A | 1.8 | 1.3 | 25 | 0.8 |
| Example 4 | 3.5 | Resin A | Organic filler A | 1.8 | 1.3 | 1 | 1.9 |
| Example 5 | 4.7 | Resin A | Organic filler A | 1.8 | 1.3 | 0.3 | 2.6 |

TABLE 1-continued

| | Average thickness a (μm) of adhesive porous layer | Resin type | Filler Type | Volume average particle diameter r (μm) | D90 − D10 (μm) | Content (% by mass) | a/r |
|---|---|---|---|---|---|---|---|
| Example 6 | 3.0 | Resin A | Organic filler B | 3.0 | 2.0 | 20 | 1.0 |
| Example 7 | 2.2 | Resin A | Inorganic fillers C, D | 1.2 | 1.6 | 10 | 1.8 |
| Example 8 | 2.1 | Resins A, B | Organic filler A | 1.8 | 1.3 | 30 | 1.2 |
| Comparative Example 1 | 1.3 | Resin A | — | — | — | 0 | — |
| Comparative Example 2 | 3.1 | Resin A | Inorganic filler D | 0.8 | 1.1 | 40 | 3.9 |
| Comparative Example 3 | 5.5 | Resin A | Organic filler A | 1.8 | 1.3 | 20 | 3.1 |
| Comparative Example 4 | 2.0 | Resin A | Organic filler E | 5.0 | 3.6 | 1 | 0.4 |
| Comparative Example 5 | 0.7 | Resin A | Organic filler A | 1.8 | 1.3 | 5 | 0.4 |
| Comparative Example 6 | 5.0 | Resin A | Organic filler E | 5.0 | 3.6 | 5 | 1.0 |
| Comparative Example 7 | 2.1 | Resin A | Organic filler F | 4.0 | 2.5 | 30 | 0.5 |

TABLE 2

| | Physical properties of separator | | | | | | | | | |
|---|---|---|---|---|---|---|---|---|---|---|
| | Peeling force (N/cm) | Curving (mm) | Charge voltage (kV) | Surface roughness (μm) | Static friction coefficient | Dynamic friction coefficient | Roll appearance Wrinkle | Roll appearance Gauge band | Slit end surface | Adhesiveness to electrode | Cycle characteristics (%) |
| Example 1 | 0.15 | 1 | −0.5 | 1.8 | 0.23 | 0.14 | Absent | Absent | Good | A | 91 |
| Example 2 | 0.18 | 1 | −0.2 | 2.8 | 0.20 | 0.12 | Absent | Absent | Good | B | 85 |
| Example 3 | 0.14 | 2 | −0.2 | 2.9 | 0.21 | 0.12 | Absent | Absent | Good | A | 90 |
| Example 4 | 0.16 | 1 | −0.9 | 1.1 | 0.29 | 0.17 | Absent | Absent | Good | A | 90 |
| Example 5 | 0.20 | 2 | −1.3 | 1.0 | 0.50 | 0.30 | Absent | Absent | Defective | A | 88 |
| Example 6 | 0.18 | 1 | −0.3 | 4.2 | 0.22 | 0.13 | Absent | Absent | Good | B | 82 |
| Example 7 | 0.16 | 1 | −0.4 | 1.7 | 0.30 | 0.18 | Absent | Absent | Good | A | 90 |
| Example 8 | 0.35 | 2 | −0.2 | 3.0 | 0.21 | 0.12 | Absent | Absent | Good | A | 92 |
| Comparative Example 1 | 0.14 | 4 | −1.4 | 0.9 | 0.85 | 0.51 | Present | Present | Defective | A | 91 |
| Comparative Example 2 | 0.17 | 2 | −0.2 | 1.3 | 0.45 | 0.27 | Present | Present | Good | A | 90 |
| Comparative Example 3 | 0.20 | 1 | −0.8 | 1.1 | 0.32 | 0.19 | Present | Present | Good | A | 90 |
| Comparative Example 4 | 0.14 | 2 | −0.8 | 4.9 | 0.19 | 0.11 | Absent | Absent | Defective | D | 61 |
| Comparative Example 5 | 0.13 | 1 | −0.4 | 2.0 | 0.21 | 0.13 | Absent | Absent | Defective | D | 70 |
| Comparative Example 6 | 0.18 | 2 | −0.6 | 5.3 | 0.30 | 0.18 | Absent | Absent | Good | C | 65 |
| Comparative Example 7 | 0.15 | 1 | −0.3 | 3.0 | 0.50 | 0.15 | Absent | Absent | Defective | D | 78 |

As is evident from Table 2, the separators of Examples 1 to 8 have good adhesiveness to the electrode, and the batteries obtained by using the separators of Examples 1 to 8 have good cycle characteristics.

Further, in the separators of Examples 1 to 8, the development of a wrinkle and a gauge band was suppressed in the roll appearance, and good handling property was exhibited. Therefore, each of the separators of Examples 1 to 8 has high yield in the battery production.

INDUSTRIAL APPLICABILITY

The separator of the invention is suitable for used in a non-aqueous secondary battery, specifically, a non-aqueous secondary battery having an aluminum-laminated outer package.

The disclosure of Japanese Patent Application No. 2011-231837, filed Oct. 21, 2011, is incorporated herein by reference in their entirety.

All publications, patent applications, and technical standards mentioned in this specification are herein incorporated by reference to the same extent as if each individual publication, patent application, or technical standard was specifically and individually indicated to be incorporated by reference.

The invention claimed is:

1. A separator for a non-aqueous secondary battery, comprising:
    a porous substrate; and
    an adhesive porous layer provided on one or both sides of the porous substrate, the adhesive porous layer comprising:
        a polyvinylidene-fluoride resin; and
        a filler, a difference between a particle diameter at 90% cumulative volume of the filler and a particle diameter at 10% cumulative volume of the filler being 2 μm or less, and the adhesive porous layer satisfying the following Inequality (1):

$$0.5 \leq a/r \leq 3.0 \quad \text{Inequality (1):}$$

wherein, in Inequality (1), "a" represents an average thickness (μm) of the adhesive porous layer on one of the sides of the porous substrate; and "r" represents a volume average particle diameter (μm) of the filler contained in the adhesive porous layer.

2. The separator for a non-aqueous secondary battery according to claim 1, wherein a proportion of the filler with respect to a total mass of the polyvinylidene-fluoride resin and the filler in the adhesive porous layer is from 1% by mass to 30% by mass.

3. The separator for a non-aqueous secondary battery according to claim 1, wherein an average thickness of the adhesive porous layer on one of the sides of the porous substrate is from 0.5 μm to 5 μm.

4. The separator for a non-aqueous secondary battery according to claim 1, wherein a volume average particle diameter of the filler is from 0.01 μm to 10 μm.

5. A non-aqueous secondary battery, comprising:
a positive electrode;
a negative electrode; and
the separator for a non-aqueous secondary battery according to claim 1 arranged between the positive electrode and the negative electrode,
wherein electromotive force is obtained by lithium doping/dedoping in the non-aqueous secondary battery.

6. The separator for a non-aqueous secondary battery according to claim 1, wherein:
a proportion of the filler with respect to a total mass of the polyvinylidene-fluoride resin and the filler in the adhesive porous layer is from 1% by mass to 30% by mass;
an average thickness of the adhesive porous layer on one of the sides of the porous substrate is from 0.5 μm to 5 μm; and
a volume average particle diameter of the filler is from 0.01 μm to 10 μm.

7. The non-aqueous secondary battery according to claim 5, wherein:
a proportion of the filler with respect to a total mass of the polyvinylidene-fluoride resin and the filler in the adhesive porous layer is from 1% by mass to 30% by mass;
an average thickness of the adhesive porous layer on one of the sides of the porous substrate is from 0.5 μm to 5 μm; and
a volume average particle diameter of the filler is from 0.01 μm to 10 μm.

* * * * *